United States Patent [19]

Nakai et al.

[11] Patent Number: 4,965,312
[45] Date of Patent: Oct. 23, 1990

[54] NONAQUEOUS VEHICLE COMPOSITION FOR COATING MATERIALS

[75] Inventors: Noboru Nakai, Hiratsuka; Osamu Isozaki, Yokohama; Susumu Midogohchi, Hiratsuka, all of Japan

[73] Assignee: Kansai Paint Company, Limited, Hyogo, Japan

[21] Appl. No.: 924,477

[22] Filed: Oct. 29, 1986

[30] Foreign Application Priority Data

Nov. 1, 1985 [JP] Japan .................................. 60-246898

[51] Int. Cl.$^5$ .............................................. C08L 83/07
[52] U.S. Cl. ..................................... 524/506; 524/730; 524/731
[58] Field of Search ................ 524/457, 506, 731, 730; 525/479

[56] References Cited

U.S. PATENT DOCUMENTS

| | | | |
|---|---|---|---|
| 3,365,414 | 1/1968 | Fisk et al. ............................ | 524/390 |
| 3,385,812 | 3/1968 | Brachman ........................... | 524/506 |
| 3,405,087 | 10/1968 | Fryd ..................................... | 524/461 |
| 3,445,415 | 5/1969 | Gekada, Jr. et al. ................ | 525/479 |
| 3,551,525 | 12/1970 | Wilhelm et al. .................... | 525/296 |
| 3,898,300 | 8/1975 | Hilliard .............................. | 525/479 |
| 3,923,923 | 12/1975 | Fiedler ............................... | 525/479 |
| 4,070,414 | 1/1978 | Falender et al. .................... | 525/479 |
| 4,071,577 | 1/1978 | Folender et al. ................... | 524/506 |
| 4,618,656 | 10/1986 | Kawakubo et al. ................ | 525/404 |
| 4,687,818 | 8/1987 | Kawakubo et al. ................ | 525/479 |

FOREIGN PATENT DOCUMENTS 2717227  4/1976  Fed. Rep. of Germany ...... 525/479

Primary Examiner—John C. Bleutge
Assistant Examiner—David W. Woodward
Attorney, Agent, or Firm—Armstrong, Nikaido, Marmelstein, Kubovcik & Murray

[57] ABSTRACT

A vehicle composition for coating materials is disclosed. The vehicle composition includes an organic liquid, finely divided particles of a vinyl polymer dispersed in the organic liquid and a polymer of alkoxysiloxane having an alkoxy group of 3 to 5 carbon atoms dissolved in the organic liquid. The vehicle composition is prepared by polymerizing at least one vinyl monomer in the organic liquid which has the alkoxysiloxane polymer dissolved therein, the organic liquid being capable of dissolving the vinyl monomer but incapable of dissolving the vinyl polymer obtained therefrom.

4 Claims, No Drawings

NONAQUEOUS VEHICLE COMPOSITION FOR COATING MATERIALS

This invention relates to a nonaqueous vehicle composition for coating materials and more particularly to a nonaqueous vehicle composition for coating materials capable of giving fire-retardant or incombustible costs.

Generally resins composed of alkoxysilane or like inorganic compound have been heretofore used as vehicle components for coating materials, because of their excellence in adhesive power, chemical resistance, incombustibility and hardness. However, since these inorganic resins are costly and poor in film-forming property, it is common practice to use the inorganic resin in mixture with an organic resin to diminish the defects. While available at lower costs, a mixture of organic and inorganic resins is low in heat resistance and flame resistance and entails problems in use as a vehicle component for paint for covering heat-resistant materials or the like in buildings currently requiring the use of fire-retardant or incombustible materials.

It is an object of the present invention to provide an inexpensive vehicle composition for coating materials able to form coats outstanding in heat resistance, flame resistance, fire retardancy and incombustibility.

It is another object of the invention to provide a vehicle composition for coating materials which is so excellent in film-forming property as to form coats of various thicknesses free from cracks.

This invention provides a vehicle composition for coating materials comprising an organic liquid, vinyl polymer particles dispersed in the organic liquid and a polymer of alkoxysiloxane having an alkoxy group of 3 to 5 carbon atoms and dissolved in the organic liquid, the vehicle composition being prepared by polymerizing at least one vinyl monomer in the organic liquid having dissolved therein said alkoxysiloxane polymer, said organic liquid being capable of dissolving said vinyl monomer but incapable of dissolving said vinyl polymer obtained therefrom.

Our research reveals that the nonaqueous dispersion of vinyl polymer particles produced by polymerizing vinyl monomer in organic liquid having dissolved therein the above-specified alkoxysiloxane polymer as dispersion stabilizer can form coats improved in resistance to heat and flame, fire retardancy and incombustibilty so that the dispersion is very useful as a vehicle for fire-retardant, incombustible coating materials. Further the dispersion has such good film-forming property that it gives coats unlikely to have cracks when about 500 $\mu$ in thickness. In addition, the dispersion can be prepared using a low-cost vinyl polymer, hence economically advantageous.

The alkoxysiloxane polymers to be used as a dispersion stabilizer in the invention include known polymers of alkoxysiloxanes having an alkoxy group of 3 to 5 carbon atoms in the molecule, such as the polymer of alkoxysilane compounds disclosed in U.S. Pat. No. 4605446. Stated more specifically, such alkoxysiloxane polymer is prepared, for example, by adding water to a starting alkoxysilane compound in a suitable organic solvent, followed by heating the solution to a temperature of about 40 to about 150° C. for about 1 to about 24 hours in the presence of an acid catalyst. The amount of water to be added is preferably in the range of 0.1 to 0.9 equivalent per alkoxy group in the alkoxysilane compound. Examples of starting alkoxysilane compounds are those having 3 to 4 alkoxy groups such as tripropoxymethylsilane, tripropoxyethylsilane, tripropoxybutylsilane, tributoxymethylsilane, tributoxyethylsilane, tributoxypropylsilane, tributoxybutylsilane, tributoxyphenylsilane, tetrapropoxysilane, tetrabutoxysilane, tetrapentoxysilane, and the like. Also usable are low condensation products of these compounds. Preferred examples of alkoxysilane compounds are tripropoxymethylsilane, tripropoxyethylsilane, tetrapropoxysilane, etc. Organic solvents useful in the foregoing method for preparing the alkoxysiloxane polymers include, for example, alcohols such as methyl alcohol, ethyl alcohol, n-propyl alcohol, isopropyl alcohol, n-butyl alcohol, isobutyl alcohol, ethyl cellosolve and the like. These solvents are usable in mixture with other solvents such as esters, ketones or aromatic hydrocarbons. Examples of useful acid catalysts are hydrochloric acid, sulfuric acid, nitric acid, phosphoric acid, formic acid, acetic acid and the like.

As another option, it is also possible to prepare an alkoxysiloxane polymer by mixing a silicic acid or a lower condensation product thereof with an alcohol having 3 to 5 carbon atoms and heating the mixture to a temperature of about 40 to about 150° C. for about 1 to about 24 hours. Examples of useful alcohols having 3 to 5 carbon atoms are n-propyl alcohol, isopropyl alcohol, n-butyl alcohol, isobutyl alcohol, sec-butyl alcohol, tert-butyl alcohol, n-amyl alcohol, isoamyl alcohol, sec-amyl alcohol, tert-amyl alcohol, etc. Preferred examples of such alcohols are n-butyl alcohol, isopropyl alcohol, n-propyl alcohol, isobutyl alcohol, sec-butyl alcohol, etc.

Alkoxysiloxane polymers to be used in the present invention are those having an alkoxy group of 3 to 5 carbon atoms. The polymers having an alkoxy group of fewer than 3 carbon atoms are less effective as a dispersion stabilizer, whereas those with an alkoxy group of more than 5 carbon atoms result in coating of reduced drying property. Preferred examples of alkoxysiloxane polymers are isopropoxypolysiloxane, butoxypolysiloxane, etc.

It is preferred in the invention to use an alkoxysiloxane polymer having a weight average molecular weight of about 1,000 to about 100,000. The polymer having a weight average molecular weight of less than about 1,000 is insufficient in stability to dispersion of particles, tending to cause coalescence and sedimentation and to give coats low in film-forming property, bonding power, fire retardancy, incombustibility and the like. The use of a polymer with a weight average molecular weight of more than about 100,000 reduces the solubility in organic liquid and appreciably increases the viscosity of dispersion. Accordingly the polymers outside the foregoing range in weight average molecular weight are undesirable. Preferred range of weight average molecular weight is between about 8,000 and about 30,000.

The alkoxysiloxane polymer may have a silanol group in the molecule. The silanol group contained therein is cross-linkable with hydroxyl group or like functional group present in vinyl polymer as is the case with alkoxy group.

The vehicle composition of the present invention can be prepared by polymerizing at least one vinyl monomer in an organic liquid having dissolved therein the alkoxysiloxane polymer as a dispersion stabilizer. It is known to obtain a nonaqueous dispersion of polymeric particles by polymerizing vinyl monomer in an organic liquid in the presence of a variable kind of dispersion stabilizer other than alkoxysiloxane polymer (e.g. Japanese Patent Nos. 317938, 458051, 286387 and 416484, Japanese Examined Patent Publications Nos. 16147/1968, 8537/1972 and 11838/1972 and U.S. Pat. Nos. 3405087, 3551525 and 3365414). Of these conventional polymerization methods, a suitable method can be used to prepare the composition of the present invention. The organic liquids useful for preparing the composition of the invention include those substantially unable to dissolve the polymeric particles prepared by the polymerization, but able to dissolve the alkoxysiloxane polymer used as a dispersion stabilizer and vinyl monomer. Examples of usable organic liquids are aliphatic hydrocarbons such as pentane, hexane, heptane, octane, mineral spirit, naphtha and the like; aromatic hydrocarbons such as benzene, toluene, xylene and the like: alcohols, ethers, esters and ketones, including isopropyl alcohol, n-butyl alcohol, isobutyl alcohol, octyl alcohol, cellosolve, butyl cellosolve, diethylene glycol monobutyl ether, methylisobutyl ketone, diisobutyl ketone, ethylacyl ketone, methylhexyl ketone, ethylbutyl ketone, ethyl acetate, isobutyl acetate, acyl acetate, 2ethylhexyl acetate, etc. These organic liquids can be used singly or at least two of them are usable in mixture. Generally it is preferred to use an organic solvent predominantly containing aliphatic hydrocarbons in mixture with aromatic hydrocarbons, alcohols, ethers, esters and/or ketones. When required, the composition of the invention can contain trichlorotrifluoroethane, metaxylenehexafluoride, tetrachlorohexafluorobutane or the like to render the composition fire retardant and incombustible. Preferred examples of organic liquids are heptane alone or in mixture with n-butanol or isopropanol.

A wide variety of vinyl monomers are usable for polymerization in the presence of the alkoxypolysiloxane polymer as a dispersion stabilizer and the organic liquid since the kind of the monomer is not specifically limited insofar as it is a vinyl monomer. Suitable examples thereof are as follows:

(a) acrylate or methacrylate including (i) $C_{1-18}$ alkyl ester of acrylic or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like (ii) glycidyl acrylate, glycidyl methacrylate and the like: (iii) $C_{2-8}$ alkenyl ester of acrylic or methacrylic acid such as allyl acrylate, allyl methacrylate and the like: (iv) $C_2$[hydroxyalkyl ester of acrylic or methacrylic acid such as hydroxyethyl acrylate, hydroxyethyl methacrylate, hydroxypropyl acrylate, hydroxypropyl methacrylate and the like: (v) $C_{3-}$alkenyloxyalkyl ester of acrylic or methacrylic acid such as allyloxyethyl acrylate, allyloxyethyl methacrylate and the like;

(b) acryl based polyester including as an esterification product of 2 moles of acrylic or methacrylic acid and 1 mole of dihydric alcohol such as ethylene glycol, 1,4-butanediol, 1,6-hexanediol and the like: esterification product of 2 moles of acrylic or methacrylic acid and 1 mole of polyalkylene glycol such as polyethylene glycol, polypropylene glycol, polybutylene glycol and the like esterification product of 2 moles of hydroxyalkyl acrylate or methacrylate and 1 mole of phosphorus pentoxide compound; esterification product of 3 moles of acrylic or methacrylic acid and 1 mole of trihydric alcohol such as trimethylolpropane, pentaerythritol and the like; (c) aromatic vinyl compound including styrene, α-methylstyrene, vinyl toluene, p-chlorostyrene vinylpyridine and the like;

(d) α,β-ethylenically unsaturated acid including acrylic acid, methacrylic acid, itaconic acid and the like:

(e) alkoxysilane-containing vinyl monomer including a condensation product of hydroxyalkyl acrylate or methacrylate and tetraalkoxysilane such as condensation product of 2-hydroxypropyl methacrylate and tetraethoxysilane: addition product of acrylic or methacrylic acid and glycidoxyalkyltrialkoxysilane such as addition product of methacrylic acid and glycidoxypropyltrimethoxysilane: addition product of glycidyl acrylate or methacrylate and aminoalkylalkoxysilane such as addition product of glycidyl methacrylate and aminoethyltrimethoxysilane: acryloxyalkylalkoxysilane or methacryloxyalkylalkoxysilane such as methacryloxyethyltriethoxysilane, methacryloxypropyltrimethoxysilane and the like vinylalkoxysilane such as vinyltrimethoxysilane, vinyltriethoxysilane, vinyltris (β methoxyethoxy)silane and the like:

(f) others including acrylonitrile, methacrylonitrile, methylisopropenyl ketone, vinyl acetate, Beova monomer (product of Shell Chemical Co., Ltd.), vinyl propionate, and the like.

These monomers can be used singly or at least two of them are usable in mixture.

Of these monomers, preferred examples are methyl acrylate, methyl methacrylate, ethyl acrylate, 2-hydroxyethyl acrylate, 2-hydroxyethyl methacrylate, acrylonitrile, 1,6-hexanediol diacrylate, γ-methacryloxypropyl trimethoxy-silane, etc. When acryl based polyester, alkoxysilane-containing vinyl monomer, a combination of alkoxysilane-containing vinyl monomer and α,β-ethylenically unsaturated carboxylic acid, or a combination of alkoxysilane-containing vinyl monomer and hyroxyalkyl acrylate or methacrylate is used alone or in mixture with other vinyl monomer, there occurs crosslinking within the polymeric particles, which improves the water resistance, solvent resistance and the like. When partly or wholly using an alkoxysilane-containing vinyl monomer, α,β-ethylenically unsaturated carboxylic acid, hydroxyalkyl acrylate or methacrylate or like monomers, a stable dispersion is obtained with the polymeric particles and dispersion stabilizer bonded together.

The foregoing monomer can be polymerized using a radical polymerization initiator. Usable as radical polymerization initiators are azo based initiators such as 2,2-azoisobutyronitrile, 2,2'-azobis(2,4-dimethylvaleronitrile) and like azo compounds, and peroxide based initiators such as benzoyl peroxide, lauryl peroxide, tert-butyl peroctoate and like peroxides. These initiators are usable in an amount of usually about 0.2 to about 10 parts by weight per 100 parts by weight of the monomer to be polymerized.

While widely variable depending on the kind of polymer and the like, the amount of the alkoxysiloxane polymer used as a dispersion stabilizer is usually about 0.5 to about 70% by weight, preferably about 5 to about 50% by weight, based on the total amount of the monomer to be polymerized and dispersion stabilizer. The use of less than about 0.5% by weight of stabilizer fails to prepare a stable dispersion, whereas the use of more than about 70% by weight renders the system more like a solution, consequently reducing the coating workability, hence undesirable.

The combined concentration of the monomer and dispersion stabilizer in the organic liquid is about 30 to about 70% by weight, preferably about 40 to about 60% by weight.

The polymerization is conducted by known methods. The polymerization reaction is performed usually at a temperature of about 60 to about 160° C. to produce a nonaqueous dispersion comprising organic liquid having dispersed therein vinyl polymer particles. The polymerization reaction is usually completed in about 1 to about 15 hours. The vinyl polymer particles thus obtained usually have an average particle size of 0.1 to 5 $\mu$.

The nonaqueous dispersion of the polymer thus obtained gives a coat with a continuous phase composed mainly of the alkoxysiloxane polymer used as a dispersion stabilizer. Accordingly the surface of coat and the interface between the coat and the substrate chiefly exhibit the characteristics of inorganic component and are excellent in properties such as flame resistance, heat resistance, bonding power, hardness and the like, while the particles of vinyl polymers dispersed in the composition aid to enhance the film-forming property. The nonaqueous dispersion of the polymer also displays thixotropy so that it is improved in coating workability (particularly, in freedom from sagging) and is highly curable even when dried at ambient temperature.

While usable as it is, the dispersion of the present invention can be admixed with a coloring pigment, extender pigment, viscosity modifier, film-forming agent and other additives, when required.

The present invention will be described below in more detail with reference to the following Examples, Reference Examples and Comparison Example to which the invention is limited in no way and in which the parts and percentages are all by weight. Film-forming test, heat resistance test and flame resistance test were carried out by the following methods.

Film-forming test

Each of the dispersions obtained in Examples was applied to a slate plate and heated to 180° C. for 30 minutes to produce coats of various thicknesses (maximum thickness: 500 $\mu$). The coats thus formed were observed to determine the thickness of coat having cracks. Heat resistance test Each of the dispersions obtained in Examples and Comparison Example was applied to a slate plate and heated to 180° C. for 30 minutes to form a coat having a thickness of 20 $\mu$. The coated plate was heated to 300° C. for 30 minutes for the test.

Flame resistance test

Coated plates produced in the same manner as above in the heat-resistance test were heated directly by a gas burner at about 1,000° C. for 3 minutes.

REFERENCE EXAMPLE 1

Preparation of dispersion stabilizer

A 350 g quantity of 8% sulfuric acid was added to 500 g of a 10% aqueous solution of tetrasodium pentasilicate (2Na$_2$O±5SiO$_2$). To the mixture were added 180 g of tetrahydrofuran and 50 g of n-butanol. The mixture was fully stirred and left to stand for 12 hours. Then the mixture was salted out by addition of sodium chloride, giving a silicic acid-containing extract.

To the extract was added 150 g of isopropyl alcohol. The mixture was reacted for 5 hours while distilling off the solvent, affording a 40% solution of isopropoxypolysiloxane which was found to have a weight average molecular weight of 20,000.

REFERENCE EXAMPLE 2

Preparation of dispersion stabilizer

A mixture of 320 g of tetrabutoxysilane monomer, g of ethanol, 30 g of water and 0.5 g of sulfuric acid was reacted at 90° C. for 10 hours. The reaction mixture thus obtained was diluted with n-butanol to 40% solids, giving a 40% solution of polybutoxypolysiloxane having a weight average molecular weight of 20,000.

REFERENCE EXAMPLE 3

Preparation of dispersion stabilizer

A mixture of 208 g of tetraethoxysilane monomer, 54 g of water, 1 g of formic acid, 500 g of n-amyl alcohol and 50 g of methanol was reacted at 100° C. for 3 hours. Then the mixture was further reacted for 5 hours while distilling off the solvent, giving a 40% solution of amyloxypolysiloxane which was found to have a weight average molecular weight of 18,000.

EXAMPLE 1

A 410-part portion of a 40% solution of isopropoxypolysiloxane obtained as a dispersion stabilizer in Reference Example 1 was dissolved in 500 parts of heptane in a reactor. To the solution were added dropwise at 90° C. over a period of 3 hours 60 parts of styrene, 125 parts of methyl methacrylate, 125 parts of methyl acrylate, 130 parts of ethyl acrylate, 80 parts of 2-hydroxyethyl acrylate and 2 parts of tert-butyl peroxy 2-ethylhexanoate as a catalyst. The mixture was further reacted for 2 hours, affording a turbid stable dispersion having a viscosity of A4 as determined by Gardner-Holdt bubble viscometer. The dispersion thus obtained was found stable after standing for 1 month.

A coat formed with a thickness of even 500 p from the dispersion thus obtained was found to have no crack when tested for film-forming property. When subjected to heat resistance test and flame resistance test, coats formed from the dispersion thus prepared showed no undesired change such as crack, degradation of gloss and discoloration to yellow color, and produced the desired results.

EXAMPLE 2

The general procedure of Example 1 was repeated with the exception of using the butoxypolysiloxane as a dispersion stabilizer produced in Reference Example 2, giving a turbid stable dispersion having a viscosity of A5 as determined by Gardner-Holdt bubble viscometer. The dispersion thus obtained was found stable after standing for 1 month.

A coat formed with a thickness of even 500 $\mu$ from the dispersion thus obtained was found to have no crack when tested for film-forming property. When subjected to heat resistance test and flame resistance test, coats produced from the dispersion exhibited no undesired change including crack, degradation of gloss and discoloration to yellow, and produced the desired results.

EXAMPLE 3

The general procedure of Example 1 was repeated with the exception of using 121 parts of methyl methacrylate and 4 parts of trimethylolpropane triacrylate in place of 125 parts of methyl methacrylate used in Example 1, giving a turbid stable dispersion.

A coat formed with a thickness of even 500 μ from the dispersion thus obtained was found to have no crack when tested for film-forming property When subjected to heat resistance test and flame resistance test, coats produced from the dispersion exhibited no undesired change including crack, degradation of gloss and discoloration to yellow, and produced the desired results.

COMPARISON EXAMPLE

Into a reactor were placed a solvent mixture of 50 parts of toluene and 50 parts of n-butyl alcohol. The mixture was heated to 90° C. To the solvent was added dropwise over a period of 3 hours a mixture of 12 parts of styrene, 24 parts of methyl methacrylate, 24 parts of methyl acrylate, 25 parts of ethyl acrylate, 15 parts of 2-hydroxyethyl acrylate and 0.4 part of tert-butyl peroxy 2-ethyl hexanoate. The mixture was subjected to aging for 2 hours, giving a solution of acryl copolymer. The solution was mixed with a 40% solution of butoxypolysiloxane obtained in Reference Example 2 in a 3:7 ratio, calculated as solids, affording a mixture of acryl copolymer and butoxypolysiloxane.

Coats formed from the mixture created cracks in heat resistance test and became partly carbonated in flame resistance test, namely produced the undesired results.

EXAMPLE 4

The general procedure of Example 1 was repeated with the exception of using a 40% solution of amyloxypolysiloxane prepared in Reference Example 3, together with 60 parts of styrene, 20 parts of acrylonitrile, 150 parts of methyl acrylate, 50 parts of butyl acrylate, 70 parts of ethyl acrylate, 100 parts of methyl methacrylate, 70 parts of 2-hydroxyethyl acrylate and 6 parts of γ-methacryloxypropyltrimethoxysilane, giving a turbid stable dispersion having a viscosity of A as determined by Gardner-Holdt bubble viscometer. The dispersion remained stable at room temperature for 3 months or longer.

A coat formed with a thickness of even 500 μ from the dispersion thus obtained was found to have no crack when tested for film-forming property. When subjected to heat resistance test and flame resistance test, coats produced from the dispersion exhibited no undesired change including crack, degradation of gloss and discoloration to yellow.

EXAMPLE 5

The general procedure of Example 4 was repeated with the exception of using 145 parts of methyl acrylate and 5 parts of 1,6-hexanediol diacrylate in place of 150 parts of methyl acrylate used in Example 4, giving a turbid stable dispersion having a viscosity of A1 as determined by Gardner-Holdt bubble viscometer. The dispersion remained stable at room temperature for 3 months or longer.

A coat formed with a thickness of even 500 μ from the dispersion thus obtained was found to have no crack when tested for film-forming property. When subjected to heat resistance test and flame resistance test, coats produced from the dispersion exhibited no undesired change, e.g. crack, degradation of gloss and discoloration to yellow.

What is claimed is:

1. A coating composition consisting of a non-aqueous dispersion comprising an organic liquid, particles of a vinyl polymer dispersed in the organic liquid, and a polymer of an alkoxysiloxane, wherein the alkoxy group has 3 to 5 carbon atoms, dissolved in the organic liquid, said dispersion being prepared by polymerizing at least one vinyl monomer, selected from the group consisting of acrylic acid, methacrylic acid, acrylates, methacrylates, styrene, alphamethylstyrene, vinyltoluene, p-chlorostyrene, vinylpyridine, acrylonitrile, methacrylonitrile, methylisopropenyl ketone and vinyl acetate, said organic liquid being capable of dissolving said vinyl monomer but incapable of dissolving said vinyl polymer obtained therefrom, said alkoxysiloxane polymer being contained in a concentration of about 0.5 to about 70% by weight based on the combined weight of said alkoxysiloxane polymer and said vinyl polymer, and said vinyl polymer and said alkoxysiloxane polymer being contained in the organic liquid in a combined concentration of about 30 to about 70% by weight.

2. The composition according to claim 1 wherein said alkoxysiloxane polymer has a weight average molecular weight of about 1,000 to about 100,000.

3. The composition according to claim 2 wherein said alkoxysiloxane polymer has a weight average molecular weight of about 8,000 to about 30,000.

4. The composition according to claim 1 wherein said concentration of the alkoxy siloxane polymer is in the range of about 5 to about 50% by weight.

* * * * *